US011119708B2

(12) United States Patent
Saito

(10) Patent No.: US 11,119,708 B2
(45) Date of Patent: Sep. 14, 2021

(54) INFORMATION PROCESSING APPARATUS, CONTROLLING METHOD FOR INFORMATION PROCESSING APPARATUS, AND STORAGE MEDIUM STORING PRINT EXTENSION APPLICATION

(71) Applicant: CANON KABUSHIKI KAISHA, Tokyo (JP)

(72) Inventor: Kazuyuki Saito, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/865,161

(22) Filed: May 1, 2020

(65) Prior Publication Data

US 2020/0356314 A1 Nov. 12, 2020

(30) Foreign Application Priority Data

May 9, 2019 (JP) .............................. JP2019-088702

(51) Int. Cl.
*G06F 15/00* (2006.01)
*G06F 3/12* (2006.01)
*G06K 1/00* (2006.01)

(52) U.S. Cl.
CPC ............ *G06F 3/122* (2013.01); *G06F 3/1204* (2013.01); *G06F 3/1224* (2013.01)

(58) Field of Classification Search
CPC ....... G06F 3/122; G06F 3/1204; G06F 3/1224
USPC ............................... 358/1.15, 1.14, 1.13, 1.1
See application file for complete search history.

(56) References Cited

U.S. PATENT DOCUMENTS

| 2008/0104670 | A1* | 5/2008 | Maeda | G06F 3/1214 726/3 |
| 2016/0011821 | A1* | 1/2016 | Tomihisa | G06F 3/1258 358/1.13 |
| 2019/0243585 | A1* | 8/2019 | Ajioka | G06F 3/1204 |
| 2020/0089444 | A1* | 3/2020 | Hagiwara | H04N 1/00408 |
| 2020/0257482 | A1* | 8/2020 | Taira | G06F 3/1253 |

FOREIGN PATENT DOCUMENTS

JP 2000-284924 A 10/2000

* cited by examiner

*Primary Examiner* — Douglas Q Tran
(74) *Attorney, Agent, or Firm* — Canon U.S.A., Inc. IP Division

(57) ABSTRACT

An image forming apparatus including a detailed print setting UI and a simple print setting UI as print extension applications. The image forming apparatus restricts display of the detailed print setting UI based on whether or not a CPU satisfies a predetermined condition for the display of the detailed print setting UI, and thus enables to display an appropriate print setting UI even when processing capacity of the CPU is low.

22 Claims, 11 Drawing Sheets

FIG. 9A

1. BASICS

ORIGINAL DOCUMENT SIZE: A4 [DETAILS...]
OUTPUT PAPER SIZE: [SAME AS ORIGINAL DOCUMENT SIZE ▼]
DOUBLE-SIDE PRINTING: OFF
BINDING DIRECTION: [LONG-SIDE BINDING] [DETAILS...]
PAGE AGGREGATION: OFF
OUTPUT METHOD: [PRINT ▼]

ORIGINAL DOCUMENT SIZE:
[A4 ▼]

PRINT DIRECTION:
[PORTRAIT ▼]

PAPER FEEDER:
[AUTO SELECTION ▼]

PAPER TYPE:
[AUTO ▼]

DOUBLE-SIDE PRINTING:
[OFF ▼]

[OK]

INFORMATION PROCESSING APPARATUS, CONTROLLING METHOD FOR INFORMATION PROCESSING APPARATUS, AND STORAGE MEDIUM STORING PRINT EXTENSION APPLICATION

BACKGROUND

Field of the Disclosure

The present disclosure relates to an information processing apparatus having a print setting UI (user interface), a controlling method for the information processing apparatus, and a storage medium storing a program regarding a print extension application.

Description of the Related Art

There has been generally known a printing system that uses a client computer in which a printer driver being software for controlling an image forming apparatus has been installed and instructs the image forming apparatus connected to the client computer to perform a printing process. An OS (operating system) being basic software has been installed in the client computer, and the printer driver is configured according to specifications defined by the OS. When a vendor that provides the image forming apparatus provides a user with the printer driver that meets the specifications of the OS, the user can obtain a means for performing a print instruction to the image forming apparatus.

For example, Japanese Patent Application Laid-Open No. 2000-284924 discloses an information processing apparatus that sets a data input window to a default condition according to data processing capability of a computer in which a printer driver has been incorporated.

However, in recent years, customizability of the printer driver itself has been reduced for improved stability of the OS. In order to compensate for such a reduction in the customizability, the vendor that provides the image forming apparatus provides a dedicated application (print extension application) for assisting the function of the printer driver.

The print extension application enables to set a printing function inherent in the image forming apparatus, by providing a unique print setting UI. However, in case of displaying a detailed print setting UI by which all print setting ability of the image forming apparatus can be set, there is a case where an excessive load is applied to the CPU (central processing unit) of the client computer. For this reason, in a case where the CPU of the client computer has low capacity, when it intends to display the detailed print setting UI, it takes a long time to activate the UI, or an application is forcibly terminated by the OS. In other words, there is a case where normal display is impossible.

In Japanese Patent Application Laid-Open No. 2000-284924, it has been proposed to change the default setting when the capacity of the CPU of the client computer is low. However, it is also possible to select a function that requires the processing capability of the CPU. Therefore, in case of switching the UI from the default setting UI to the detailed print setting UI and displaying the switched UI, it is impossible to reduce the processing load of the CPU. For this reason, there are still possibilities that, in case of intending to display the detailed print setting UI, the processing time becomes long, the application is forcibly terminated, and the like.

SUMMARY

The present disclosure is characterized by an information processing apparatus that is connected to a printing apparatus, and comprises a CPU, a printer driver configured to cause the printing apparatus to perform a printing process, and a print extension application configured to assist a function of the printer driver: wherein the print extension application provides a first print setting UI capable of setting first print setting ability of the printing apparatus, and a second print setting UI capable of setting second print setting ability of which a load on the CPU is smaller than that of the first print setting ability; and the print extension application performs determination as to whether to permit or inhibit display of the first print setting UI based on information regarding the CPU.

According to the present disclosure, even in a case where the processing capacity of the CPU is low, it is possible to provide the information processing apparatus capable of displaying an appropriate print setting UI.

Further features of the present disclosure will become apparent from the following description of exemplary embodiments with reference to the attached drawings.

BRIEF DESCRIPTION OF THE DRAWINGS

FIGS. 9A and 9B are diagrams for respectively describing examples of a detailed print setting UI and a simple print setting UI.

DESCRIPTION OF THE EMBODIMENTS

Hereinafter, embodiments of the present disclosure will be described with reference to the attached drawings.

Incidentally, it should be noted that the following embodiments do not limit the disclosure according to the claims. In addition, it should be noted that not all of the features described in the following embodiments are necessarily essential as means for solving the problems in the present disclosure.

First Embodiment

Figure 1:
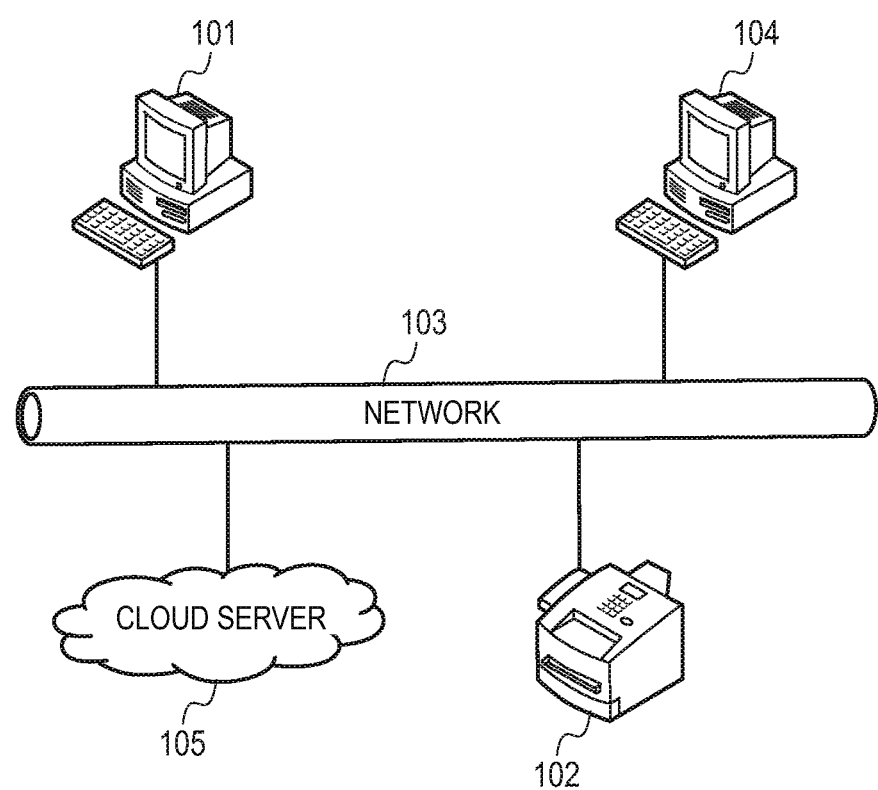
FIG. 1 is a schematic diagram for describing a configuration of a printing system.

First, a configuration of a printing system 100 according to the present embodiment will be described with reference to FIG. 1. Namely, FIG. 1 is a schematic diagram for describing the configuration of the printing system according to the present embodiment. The printing system 100 according to the present is equipped with a client computer 101, a printer 102, a server 104 and a cloud server 105.

The client computer 101 is an example of an information processing apparatus. The server 104 transmits data to the client computer 101. The printer 102 is an image forming apparatus (printing apparatus) that receives print data and performs a printing process.

Figure 3:
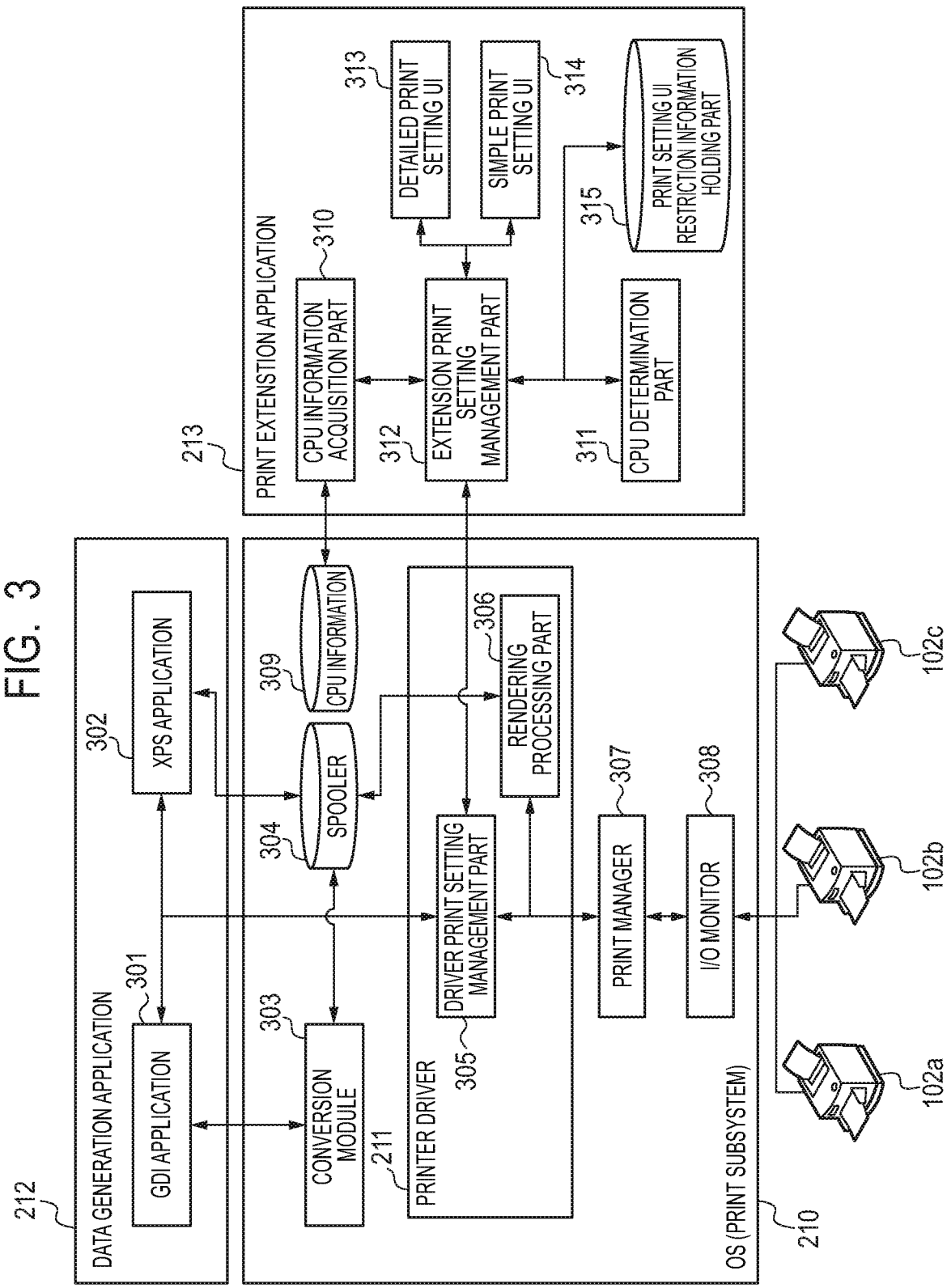
FIG. 3 is a schematic diagram for describing an example of a software configuration of the client computer.

The apparatuses and devices illustrated in FIG. 1 are mutually connected via a network 103 such as a WAN (wide area network) and the like, and configured to be communicable. Incidentally, the printer 102 may be a single-function printer that has only a printing function, or a multi-function printer that has a plurality of functions such as a printing function, a scanning function, a copying function and the like. As illustrated in FIG. 3, the plurality of printers 102 may be connected (printer a 102a, printer b 102b, and printer c 102c). Besides, the number of the client computers 101 is not limited to one and may be plural for the network 103.

Figure 2:
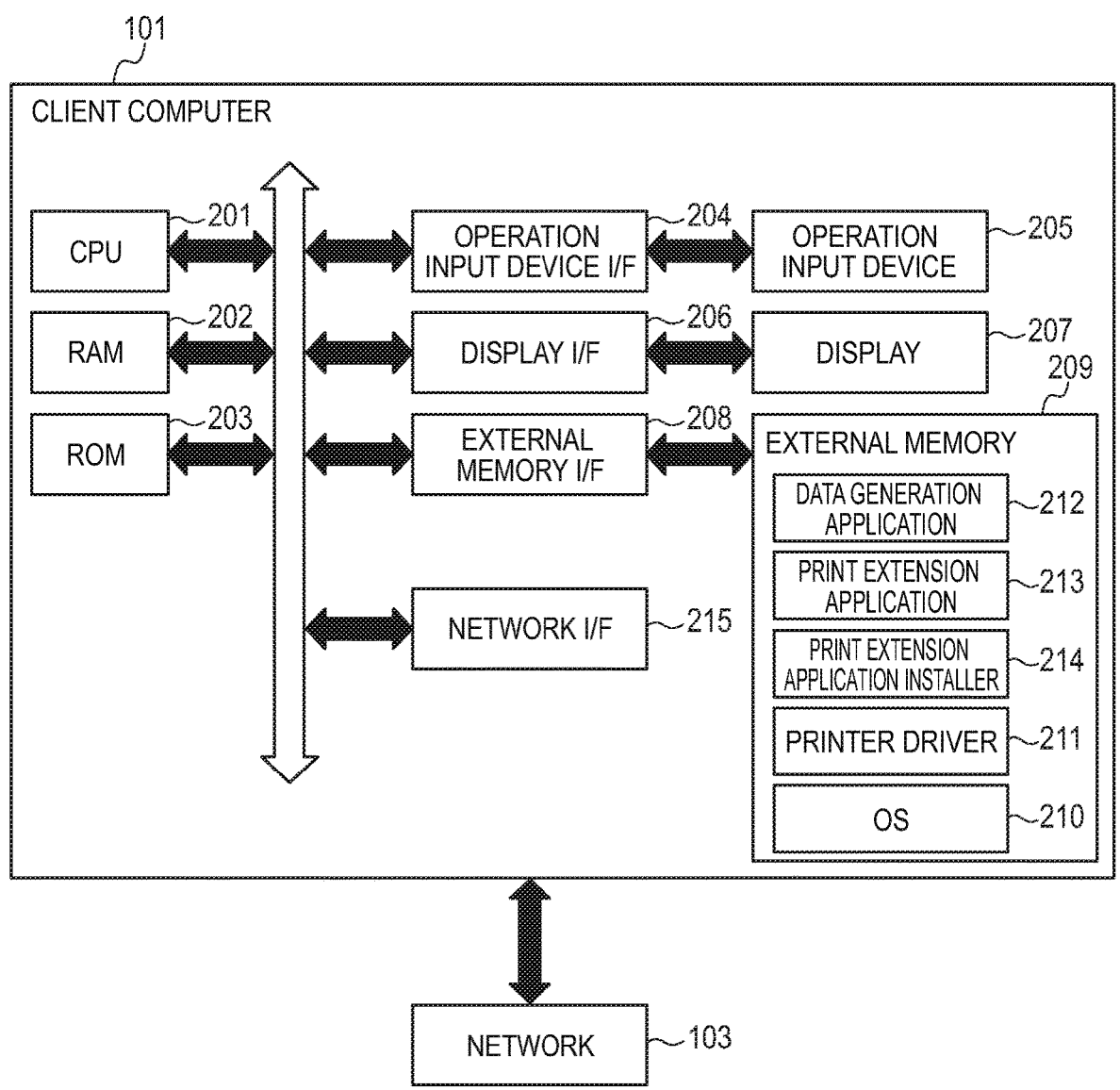
FIG. 2 is a schematic block diagram for describing an example of a hardware constitution of a client computer.

FIG. 2 is a schematic block diagram for describing a hardware constitution of the client computer 101 illustrated in FIG. 1. A CPU 201 controls each device connected to a system bus according to a program stored in a RAM (random access memory) 202. Incidentally, it is assumed that the client computer 101 is equipped with at least one CPU 201, but may be equipped with a plurality of CPU's. In addition, the CPU 201 realizes software configuration of the client computer 101 and processes of respective steps of later-described flowcharts by performing processes based on programs stored in an external memory 209.

The RAM 202 functions as a main memory, a work area and the like for the CPU 201. In a ROM (read only memory) 203, various programs such as a boot program, a BIOS (Basic Input/Output System) and the like have been written.

An operation input device I/F (interface) 204 is an interface that controls an operation input device 205 including a keyboard, a pointing device (mouse), a touch UI and the like. The operation input device 205 functions as a receiving unit that receives an operation from a user.

A display I/F 206 controls screen display on a display 207. The display 207 functions as a displaying unit that displays information to a user.

An external memory I/F 208 controls access to the external memory 209 that is constituted by an HDD (hard disk drive), an SSD (solid state disk) and/or the like. The external memory 209 stores an OS 210, a printer driver 211, a data generation application 212, a print extension application 213, a print extension application installer 214 and the like. The external memory 209 functions as a storage medium that is readable by the client computer 101.

A network I/F 215 is connected to the printer 102 via the network 103, and performs a communication controlling process.

The server 104 has a similar hardware configuration and thus, the description of such is omitted.

FIG. 3 is a schematic block diagram for describing a software configuration of the client computer 101 illustrated in FIG. 1. The data generation application 212 generates and outputs print data according to a user operation. The data generation application 212 is, for example, a document creation application or an image formation application. In the present embodiment, the data generation application 212 includes two types of applications, i.e., a GDI (Graphics Device Interface) application 301 and an XPS (XML Paper Specification) application 302, depending on a type of data to be output.

The GDI application 301 is an application that performs printing using a GDI which is a graphics component for generating a print image. The GDI application 301 outputs GDI data as print data. For example, the GDI application 301 includes a "Win32/64 application", a ".NET application" and the like.

The XPS application 302 is an application that generates XPS data as print data. A UWP (Universal Windows Platform) application is an application that is distributed via a Windows™ store, and operates in an execution environment different from that of the GDI application 301. Here, the different execution environment is, for example, in an individual sandbox (on a virtual environment), or the like. As the XPS application 302, for example, there is the UWP application.

The data generation application 212 is not limited to the GDI application 301 or the XPS application 302 described above, and may be any application that can output the print data to the printer driver.

A user causes the GDI application 301 or the XPS application 302 to perform a printing process. The printing process is performed by sequentially performing three processes of selecting a printer, creating print settings, and converting drawing data. In the present embodiment, the data generation application 212 and the print extension application 213 in the client computer 101 operate on the OS 210. Hereinafter, various constitutions and configurations of the printing system 100 according to the present embodiment will be described.

CPU information 309 is information regarding the CPU 201 of the client computer 101, and includes, for example, a type (model, etc.) of the CPU 201, hardware characteristics of the CPU 201 such as a clock frequency, the number of cores, an amount of cache memory, the number of bits and the like. The OS 210 acquires and manages the CPU information 309 as hardware information.

A driver print setting management part 305 manages control of various modules in the printer driver 211, and data exchange. Also, the driver print setting management part generates and changes print setting information.

A print manager 307 manages the schedule of the printing process.

An I/O (input/output) monitor 308 performs communication with the printer 102.

A conversion module 303 converts drawing data, which is drawing data in case of being printed from the GDI application 301, into the XPS data and temporarily stores the converted XPS data in a spooler 304.

A rendering processing part 306 renders the XPS data temporarily stored in the spooler 304, and converts the rendered data into PDL data.

The print extension application 213 is provided by the user or the OS 210 from an application distribution system on the cloud server 105 via the Internet, and is then installed in the client computer 101. The print extension application 213 cooperates with the printer driver 211 to cause the printer 102 to perform the printing process by assisting the function of the printer driver 211. The print extension application 213 is activated upon receiving an extension print setting event issued by the OS 210.

A CPU information acquisition part 310 acquires the CPU information 309, which is the information regarding the CPU 201, from the OS 210.

The print extension application 213 provides a detailed print setting UI 313 and a simple print setting UI 314. The detailed print setting UI 313 is a UI for detailed print setting capable of setting all the print setting ability of the image forming apparatus. On the other hand, the simple print setting UI 314 is a UI for simple print setting capable of setting a part of the print setting ability of the image forming apparatus. Therefore, while a load to be applied to the CPU 201 when displaying the detailed print setting UI 313 is relatively large, a load to be applied to the CPU 201 when displaying the simple print setting UI 314 is relatively small.

Here, concrete examples of the detailed print setting UI and the simple print setting UI will be described with reference to FIGS. 9A and 9B. FIG. 9A is the diagram for describing the example of the detailed print setting UI, and FIG. 9B is the diagram for describing the example of the simple print setting UI. In the present embodiment, these UIs are displayed on the display 207 of the client computer 101.

A CPU determination part 311 determines whether or not the CPU 201 satisfies a predetermined condition for displaying the detailed print setting UI 313, based on the CPU information 309 regarding the CPU 201 acquired by the CPU information acquisition part 310.

An extension print setting management part 312 restricts the display of the detailed print setting UI 313 according to a determination result by the CPU determination part 311.

A print setting UI restriction information holding part 315 holds information on whether or not to permit the display of the detailed print setting UI 313, based on the determination result by the CPU determination part 311.

Each of the detailed print setting UI 313 and the simple print setting UI 314 returns the print setting information to the OS 210 after changing the value of the print setting information according to a user's input.

Next, a mechanism for restricting the display of the detailed print setting UI 313 based on the CPU information 309 regarding the CPU 201 at a time when the print extension application is activated will be described with reference to FIGS. 4, 10A and 10B. Incidentally, it should be noted that respective applications and modules have been stored in the external memory 209, loaded into the RAM 202 as needed, and executed by the CPU 201 on the client computer 101.

Figure 4:
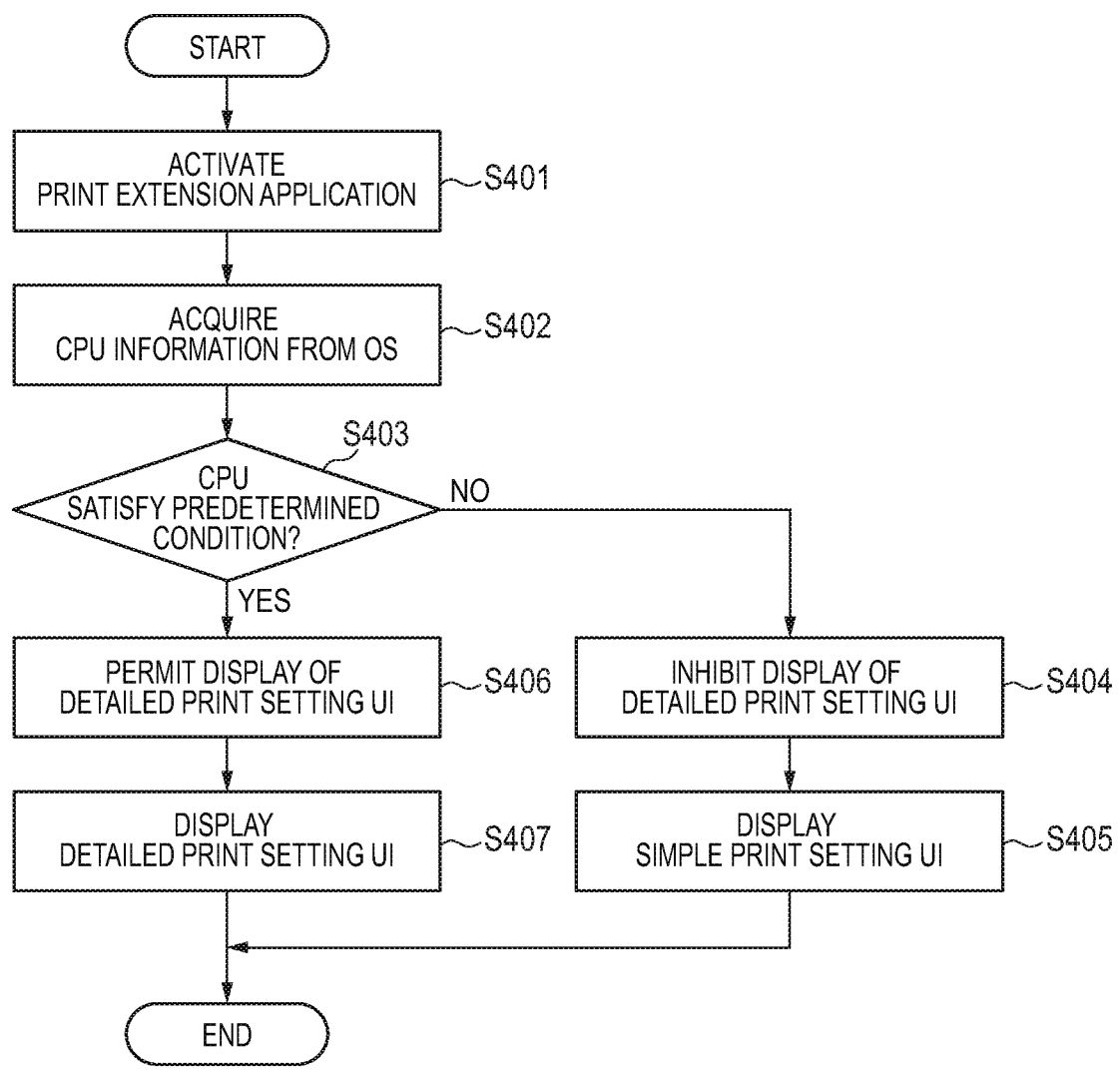
FIG. 4 is a flowchart for describing a process of a print extension application according to a first embodiment.

A flowchart illustrated in FIG. 4 starts when a print setting request event occurs from the data generation application 212. The data generation application that causes the print setting request event may be the GDI application 301 or the XPS application 302. In the present embodiment, it should be noted that the description will be made using the XPS application 302.

Figure 10A:
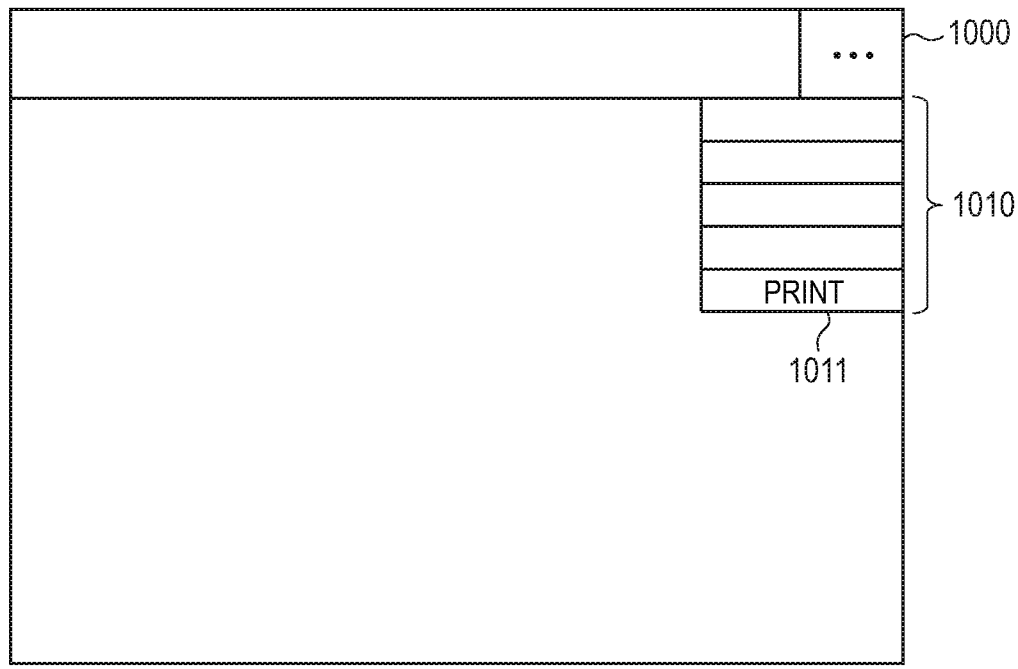
FIGS. 10A and 10B are diagrams for respectively describing examples of a data generation application and a print dialog UI.

FIG. 10A is a diagram for describing an example of the XPS application 302. In the XPS application 302, when a menu button 1000 is pressed, a list 1010 of menu options is displayed. Next, when a print item 1011 is selected by the user as the menu option, the XPS application 302 displays a print dialog 1020 for selecting a printer.

Figure 10B:
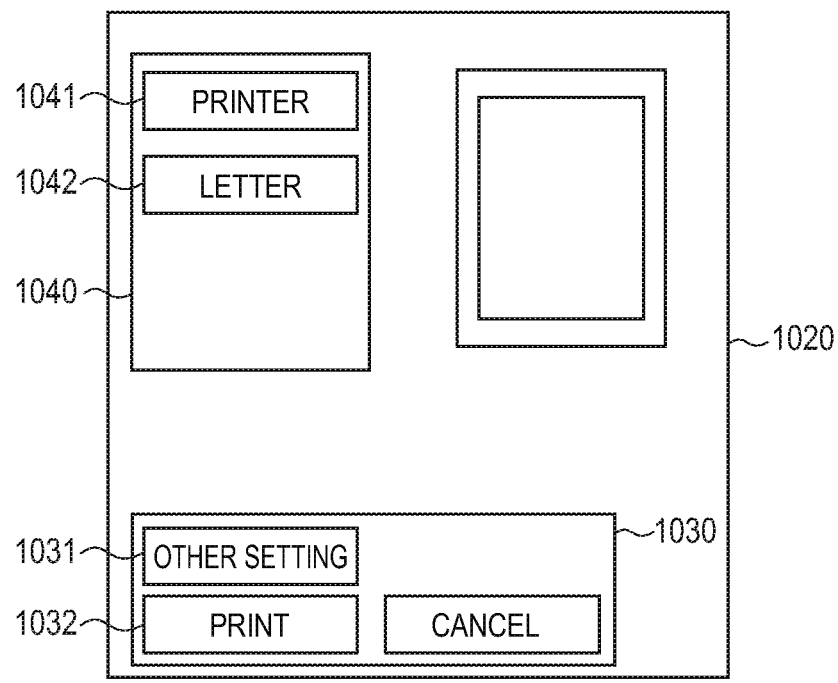

FIG. 10B is a diagram for describing an example of the print dialog 1020 displayed by the XPS application 302. The print dialog 1020 includes a print setting portion 1040 and a print event occurrence portion 1030.

A list of simple print settings is displayed in the print setting portion 1040. Here, a name of a selected print queue is shown as 1041, and a set print setting currently set is shown as 1042.

In the print dialog 1020, when an "OTHER SETTING" button 1031 of the print event occurrence portion 1030 is pressed by the user, an activation event of the print extension application 213 occurs. Besides, when a "PRINT" button 1032 of the print event occurrence portion 1030 is pressed, a print event occurs.

The flowchart illustrated in FIG. 4 starts when the XPS application 302 receives the press of the "OTHER SETTING" button 1031 of the print dialog 1020 and transmits an activation request of the print extension application 213 to the OS 210.

First, in S401, the OS 210 activates the print extension application 213 corresponding to the selected printer.

Next, in S402, the CPU information acquisition part 310 of the print extension application 213 acquires the CPU information 309 that is the information regarding the CPU 201 of the client computer 101, from the OS 210.

Next, in S403, the CPU determination part 311 of the print extension application 213 determines from the acquired CPU information 309 whether or not the CPU 201 satisfies the predetermined condition for displaying the detailed print setting UI 313. In order to determine whether or not the CPU 201 satisfies the predetermined condition for displaying the detailed print setting UI 313, the CPU determination part 311 determines based on the CPU information 309 whether or not the CPU 201 has ability sufficiently for displaying the detailed print setting UI 313.

As a method for determining whether or not the CPU 201 satisfies the predetermined condition, for example, there is a method in which a type (model, etc.) of the CPU 201 is stored in the print extension application 213 in advance. There is also a method in which a threshold is provided for each of the characteristics of the hardware of the CPU 201, such as the clock frequency of the CPU, the number of cores, the amount of cache memory, the number of bits and the like, and the determination is performed based on the provided thresholds.

When the CPU determination part 311 determines in S403 that the CPU 201 does not satisfy the predetermined condition, the extension print setting management part 312 of the print extension application 213 inhibits the display of the detailed print setting UI 313 in S404.

Then, in S405, the extension print setting management part 312 displays the simple print setting UI 314.

On the other hand, when the CPU determination part 311 determines in S403 that the CPU 201 satisfies the predetermined condition, the extension print setting management part 312 of the print extension application 213 permits the display of the detailed print setting UI 313 in S406.

Then, in S407, the extension print setting management part 312 displays the detailed print setting UI 313.

As described above, according to the first embodiment, at the time when the print application is activated, the print extension application 213 determines whether or not the CPU 201 of the client computer 101 satisfies the predetermined condition for displaying the detailed print setting UI 313. Then, when it is determined that the CPU 201 satisfies the predetermined condition, the display of the detailed print setting UI 313 is permitted. On the other hand, when it is determined that the CPU 201 does not satisfy the predetermined condition for displaying the detailed print setting UI 313, the display of the detailed print setting UI 313 is inhibited, and the simple print setting UI 314 is displayed.

Thus, even when the CPU 201 of the client computer 101 does not satisfy the condition for displaying the detailed print setting UI 313, since the simple print setting UI 314 is displayed, it is possible to prevent that it takes a long time to activate the print setting UI. Besides, it is possible to avoid an abnormality, for example, that the application is forcibly terminated by the OS, and it is possible to normally display the print setting UI.

Second Embodiment

In the first embodiment, the mechanism for restricting the display of the detailed print setting UI 313 in the case where the CPU 201 does not satisfy the predetermined condition for displaying the detailed print setting UI 313 has been described.

In the present embodiment, a mechanism for restricting the display of the detailed print setting UI 313 further in consideration of information regarding the printer driver 211 will be described.

A specific process according to the present embodiment will be described with reference to FIG. 5. Incidentally, it should be noted that respective applications and modules have been stored in the external memory 209, loaded into the RAM 202 as needed, and executed by the CPU 201 on the client computer 101. Besides, in the flowchart illustrated in FIG. 5, detailed descriptions of the processes already described will be omitted.

Figure 5:
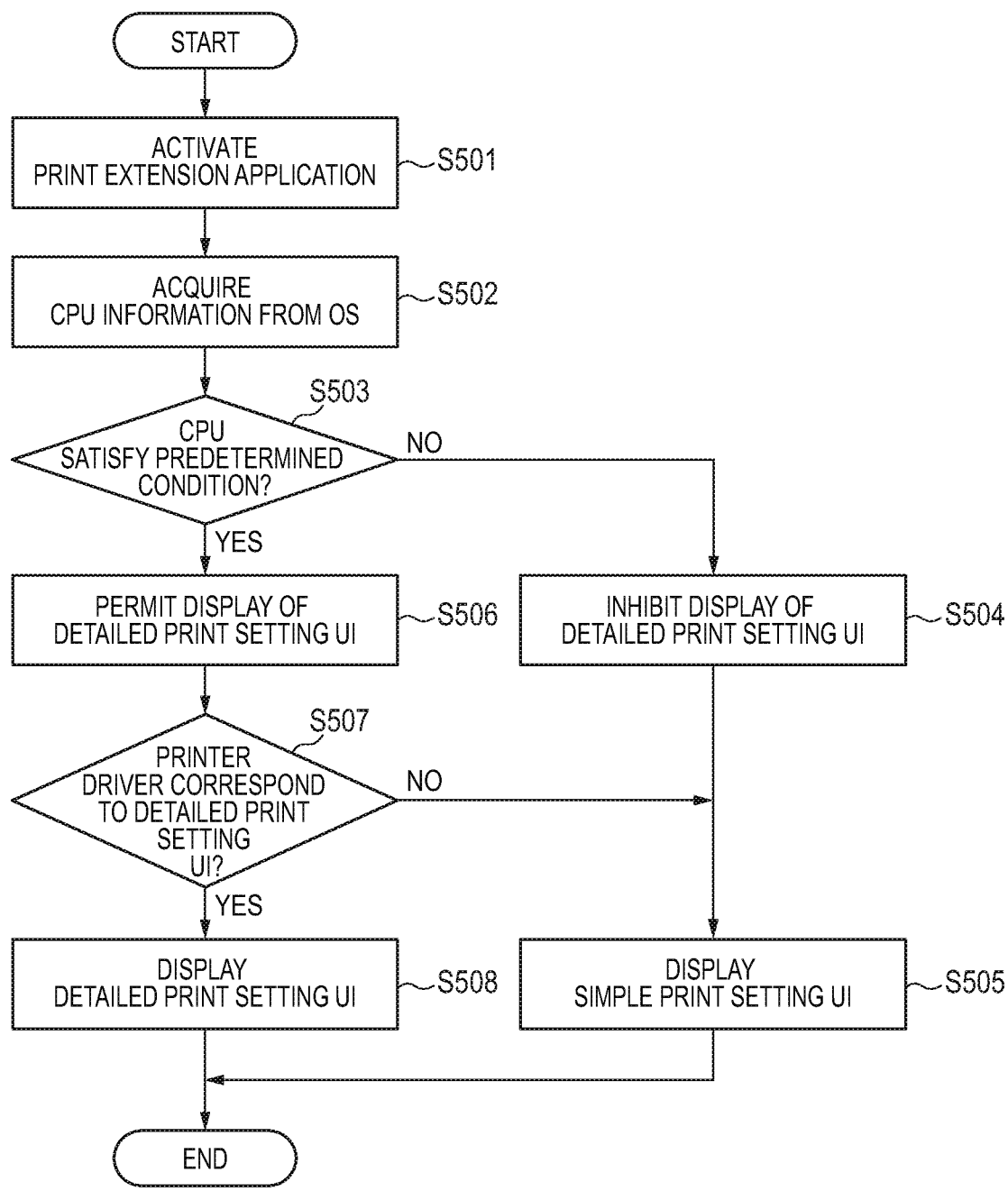
FIG. 5 is a flowchart for describing a process of a print extension application according to a second embodiment.

The flowchart illustrated in FIG. 5 starts when the XPS application 302 receives the press of the "OTHER SETTING" button 1031 of the print dialog 1020 and transmits the activation request of the print extension application to the OS 210.

Here, it should be noted that processes in S501 to S506 are the same as those in S401 to S406 illustrated in FIG. 4 and thus detailed descriptions thereof will be omitted.

When the CPU determination part 311 determines in S503 that the CPU 201 satisfies the predetermined condition, the extension print setting management part 312 permits the display of the detailed print setting UI in S506, and then the process advances to S507.

Then, in S507, the extension print setting management part 312 determines whether or not the printer driver 211 is of a type corresponding to the detailed print setting UI 313. In some cases, the printer driver 211 of which the function is limited to a part of the setting of the capacity of the image forming apparatus corresponds only to the simple print setting UI 314 but does not correspond to the detailed print setting UI 313. This is the reason why the extension print setting management part 312 performs the above determination.

When it is determined in S507 that the printer driver 211 does not correspond to the detailed print setting UI 313, the process advances to S505, and the extension print setting management part 312 displays the simple print setting UI 314.

On the other hand, when it is determined in S507 that the printer driver 211 corresponds to the detailed print setting UI 313, the extension print setting management part 312 displays the detailed print setting UI 313 in S508.

As described above, according to the second embodiment, the print extension application 213 restricts the display of the detailed print setting UI 313 also in consideration of the type of the printer driver 211.

Thus, in addition to the case where the CPU 201 does not satisfy the condition for displaying the detailed print setting UI 313, it is possible to normally display the print setting UI even in the case where the type of the printer driver 211 does not correspond to the detailed print setting UI.

Third Embodiment

In the first embodiment, the mechanism for restricting the display of the detailed print setting UI 313 in the case where the CPU 201 does not satisfy the predetermined condition for displaying the detailed print setting UI 313 has been described.

In the present embodiment, a mechanism for notifying the user, in the case where the display of the detailed print setting UI 313 is inhibited, will be described.

A specific process according to the present embodiment will be described with reference to FIG. 6. Incidentally, it should be noted that respective applications and modules have been stored in the external memory 209, loaded into the RAM 202 as needed, and executed by the CPU 201 on the client computer 101. Besides, in the flowchart illustrated in FIG. 6, detailed descriptions of the processes already described will be omitted.

Figure 6:
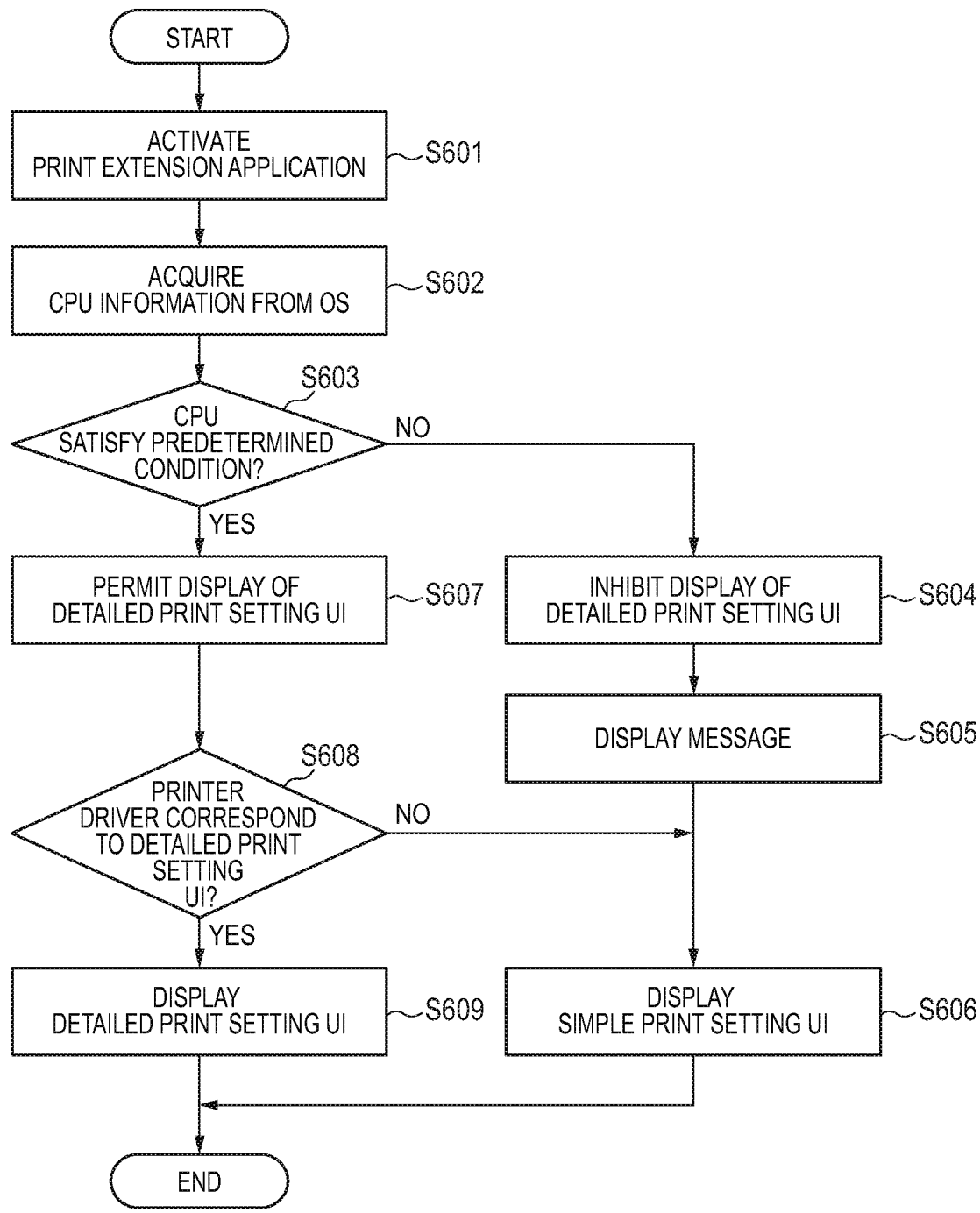
FIG. 6 is a flowchart for describing a process of a print extension application according to a third embodiment.

The flowchart illustrated in FIG. 6 starts when the XPS application 302 receives the press of the "OTHER SETTING" button 1031 of the print dialog 1020 and transmits the activation request of the print extension application to the OS 210.

Here, it should be noted that processes in S601 to S603 are the same as those in S401 to S403 illustrated in FIG. 4 and thus detailed descriptions thereof will be omitted.

When the CPU determination part 311 determines in S603 that the CPU 201 does not satisfy the predetermined condition, the extension print setting management part 312 of the print extension application 213 inhibits the display of the detailed print setting UI 313 in S604.

Figure 11A:
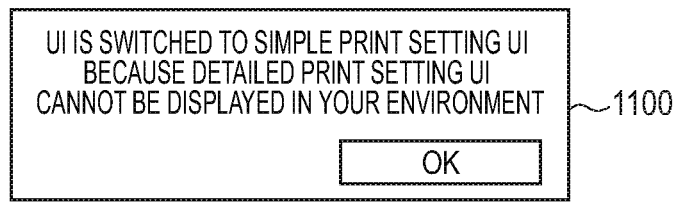
FIGS. 11A, 11B and 11C are diagrams for describing examples of a notification message and an option setting UI of the print extension application.

Then, in S605, a message 1100 (FIG. 11A) indicating that display of the detailed print setting UI 313 has been inhibited is displayed for notification to the user.

Then, in S606, the extension print setting management part 312 displays the simple print setting UI 314.

On the other hand, in a case where the CPU determination part 311 determines in S603 that the CPU 201 satisfies the predetermined condition, the extension print setting management part 312 of the print extension application 213 permits the display of the detailed print setting UI 313 in S607.

Here, it should be noted that subsequent processes in S608 to S609 are the same as those in S507 to S508 illustrated in FIG. 5 and thus detailed descriptions thereof will be omitted.

As described above, according to the third embodiment, in the case where the display of the detailed print setting UI 313 is restricted, the print extension application 213 displays the message indicating such a fact.

Thus, in the case where the display of the detailed print setting UI 313 is inhibited because the CPU 201 does not satisfy the condition for displaying the detailed print setting UI 313, it is possible to notify the user of the inhibition of the display.

Fourth Embodiment

In the first embodiment, the mechanism for restricting the display of the detailed print setting UI 313 in the case where the CPU 201 does not satisfy the predetermined condition for displaying the detailed print setting UI 313 has been described.

In the present embodiment, a mechanism for restricting display of a switching button 1111 that allows the user to manually switch between the detailed print setting UI 313 and the simple print setting UI 314 will further be described.

A specific process according to the present embodiment will be described with reference to FIG. 7. Incidentally, it should be noted that respective applications and modules have been stored in the external memory 209, loaded into the RAM 202 as needed, and executed by the CPU 201 on the client computer 101. Besides, in the flowchart illustrated in FIG. 7, detailed descriptions of the processes already described will be omitted.

Figure 7:
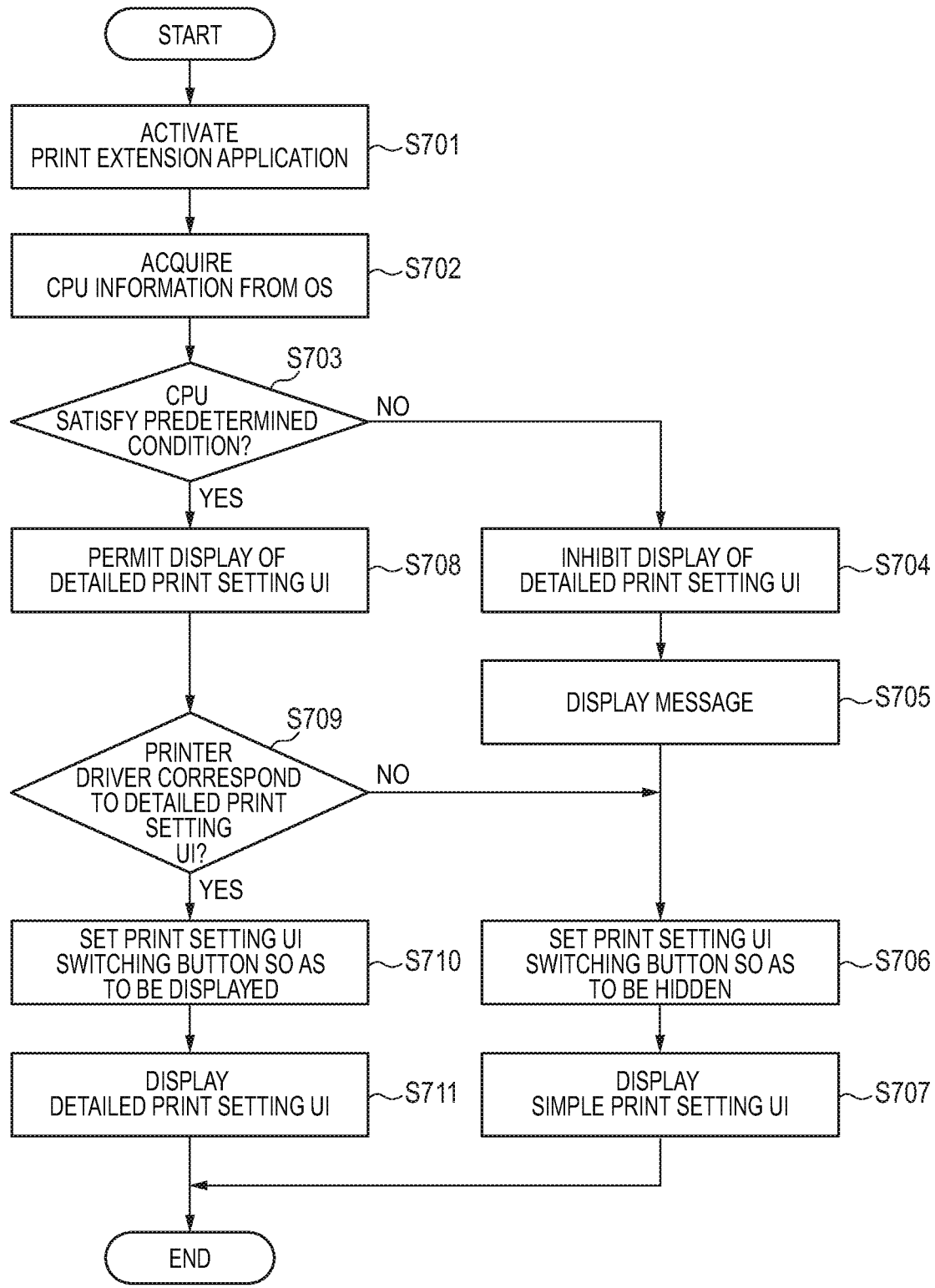
FIG. 7 is a flowchart for describing a process of a print extension application according to a fourth embodiment.

The flowchart illustrated in FIG. 7 starts when the XPS application 302 receives the press of the "OTHER SETTING" button 1031 of the print dialog 1020 and transmits the activation request of the print extension application to the OS 210.

Here, it should be noted that processes in S701 to S703 are the same as those in S401 to S403 illustrated in FIG. 4 and thus detailed descriptions thereof will be omitted.

When the CPU determination part 311 determines in S703 that the CPU 201 does not satisfy the predetermined condition, the extension print setting management part 312 of the print extension application 213 inhibits the display of the detailed print setting UI 313 in S704.

Then, in S705, the message 1100 (FIG. 11A) indicating that the display of the detailed print setting UI 313 has been inhibited is displayed for notification to the user.

Figure 11B:
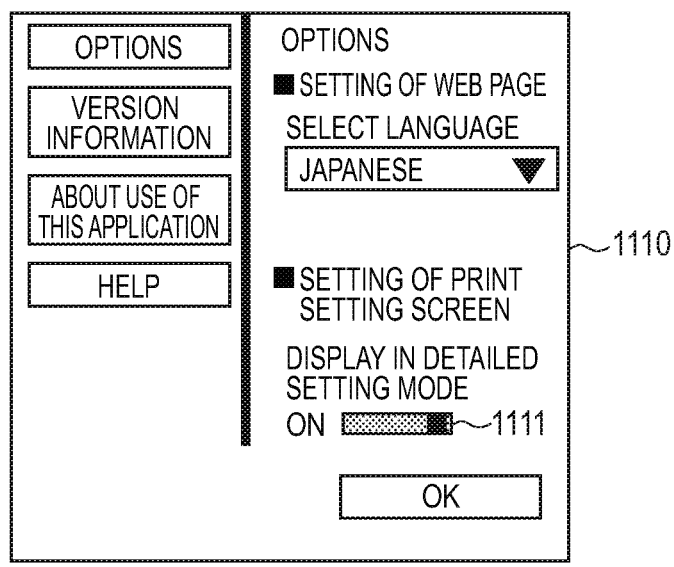
Figure 11C:
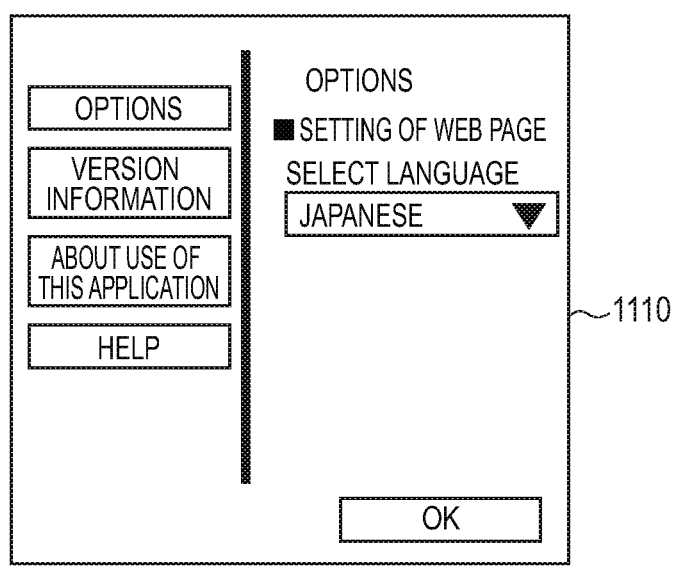

In S706, as illustrated in FIG. 11C, the extension print setting management part 312 sets the switching button 1111 for switching between the detailed print setting UI 313 and the simple print setting UI 314 in the option setting UI 1110 so as to be hidden.

Then, in S707, the extension print setting management part 312 displays the simple print setting UI 314.

On the other hand, when the CPU determination part 311 determines in S703 that the CPU 201 satisfies the predetermined condition, the extension print setting management part 312 permits the display of the detailed print setting UI 313 in S708.

Next, in S709, the extension print setting management part 312 determines whether or not the printer driver 211 corresponds to the detailed print setting UI 313.

When it is determined in S709 that the printer driver 211 corresponds to the detailed print setting UI 313, the process advances to S710. Then, as illustrated in FIG. 11B, the extension print setting management part 312 sets the switching button 1111 of the print setting UI in the option setting UI 1110 so as to be displayed. At that time, the extension print setting management part 312 enables the setting for switching the print setting UI of the option setting UI 1110.

Then, in S711, the extension print setting management part 312 displays the detailed print setting UI 313.

On the other hand, when it is determined in S709 that the printer driver 211 does not correspond to the detailed print setting UI 313, the process advances to S706. Then, as illustrated in FIG. 11B, the extension print setting management part 312 sets the switching button 1111 of the print setting UI in the option setting UI 1110 so as to be hidden. At that time, the extension print setting management part 312 disables the setting for switching the print setting UI of the option setting UI 1110.

Then, in S707, the extension print setting management part 312 displays the simple print setting UI 314.

As described above, according to the fourth embodiment, in the case where the display of the detailed print setting UI 313 is restricted, the print extension application 213 also hides the switching button 1111 of the print setting UI in the option setting UI 1110.

Thus, in the case where the display of the detailed print setting UI 313 is restricted because the CPU 201 does not satisfy the condition for displaying the detailed print setting UI 313, it is possible to surely prevent that the user erroneously changes the setting to the setting of displaying the detailed print setting UI 313.

Fifth Embodiment

In the first embodiment, the mechanism for restricting the display of the detailed print setting UI 313 at the time when the print extension application 213 is activated has been described.

In the present embodiment, a mechanism for restricting the display of the detailed print setting UI 313 according to whether or not the print extension application 213 has already been activated will be described.

A specific process according to the present embodiment will be described with reference to FIG. 8. Incidentally, it should be noted that respective applications and modules have been stored in the external memory 209, loaded into the RAM 202 as needed, and executed by the CPU 201 on the client computer 101. Besides, in the flowchart illustrated in FIG. 8, detailed description of the processing already described will be omitted.

Figure 8:
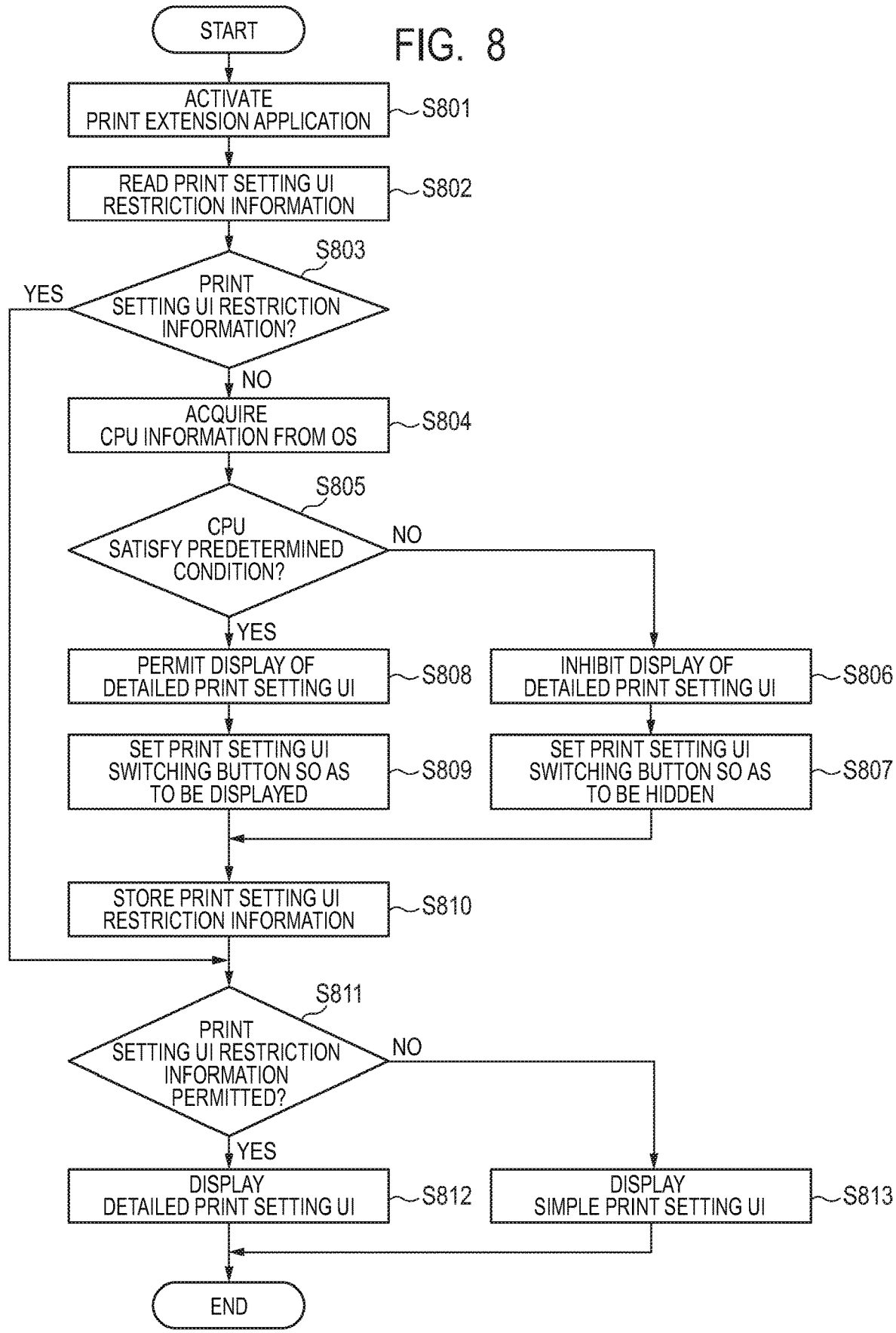
FIG. 8 is a flowchart for describing a process of a print extension application according to a fifth embodiment.

The flowchart illustrated in FIG. 8 starts by activating the print extension application 213 after the installation of the print extension application 213.

First, in S801, the OS 210 activates the print extension application 213 corresponding to the selected printer.

Next, in S802, the extension print setting management part 312 of the print extension application 213 accesses the print setting UI restriction information holding part 315 in order to read print setting UI restriction information.

Next, in S803, the extension print setting management part 312 determines whether or not there is print setting UI restriction information.

In a case where the print extension application 213 is activated for the first time, since the print setting UI restriction information is not held in the print setting UI restriction information holding part 315, it is determined in S803 that there is no print setting UI restriction information.

In that case, in S804, the CPU information acquisition part 310 of the print extension application 213 acquires the CPU information 309 from the OS 210.

Next, in S805, the CPU determination part 311 of the print extension application 213 determines from the acquired CPU information 309 whether or not the CPU 201 satisfies the predetermined condition for displaying the detailed print setting UI 313.

When the CPU determination part 311 determines in S805 that the CPU 201 satisfies the predetermined condition, the process advances to S808. Then, the extension print setting management part 312 of the print extension application 213 permits the display of the detailed print setting UI 313.

Then, in S809, the extension print setting management part 312 sets the switching button 1111 of the print setting UI in the option setting UI 1110 so as to be displayed, as illustrated in FIG. 11B. At that time, the extension print setting management part 312 enables the setting for switching the print setting UI of the option setting UI 1110.

Next, in S810, the extension print setting management part 312 stores "permission" as the print setting UI restriction information in the print setting UI restriction information holding part 315. Then, the process advances to S811.

On the other hand, when the CPU determination part 311 determines in S805 that the CPU 201 does not satisfy the predetermined condition, the process advances to S806. Then, the extension print setting management part 312 of the print extension application 213 inhibits the display of the detailed print setting UI 313.

Then, in S807, the extension print setting management part 312 sets the switching button 1111 of the print setting UI in the option setting UI 1110 so as to be hidden, as illustrated in FIG. 11C. At that time, the extension print setting management part 312 disables the setting for switching the print setting UI of the option setting UI 1110.

Next, in S810, the extension print setting management part 312 stores "inhibition" as the print setting UI restriction information in the print setting UI restriction information holding part 315. Then, the process advances to S811.

In S811, the extension print setting management part 312 determines the print setting UI restriction information stored in the print setting UI restriction information holding part 315.

When "permission" is stored as the print setting UI restriction information in S811, the detailed print setting UI 313 is displayed in S812.

On the other hand, when "inhibition" is stored as the print setting UI restriction information in S811, the simple print setting UI 314 is displayed in S813.

Here, when it is not the case where the print extension application 213 is activated for the first time, since the print setting UI restriction information has been held in the print setting UI restriction information holding part 315, it is determined in S803 that there is the print setting UI restriction information. In that case, the process advances to S811. Therefore, there is no need to determine whether or not the CPU 201 satisfies the predetermined condition each time the print extension application 213 is activated.

As described above, according to the fifth embodiment, when the print extension application 213 is activated for the first time after the installation, the determination for the CPU 201 of the client computer 101 is performed, and the determined result is stored as the print setting UI restriction information. Then, at the time of the second or subsequent activation of the print extension application 213, the display of the detailed print setting UI 313 is restricted based on the stored print setting UI restriction information.

Thus, it is possible to avoid that the determination for the CPU is performed every time the print extension application 213 is activated, and at the same time it is possible to restrict the display of the detailed print setting UI 313 according to the type and capacity of the CPU 201 and it is possible to normally display the print setting UI.

Other Embodiments

The present disclosure can be realized also by a process in which a program for realizing one of more functions of the above embodiment is supplied to a system or an apparatus via a network or a storage medium and one or more processors in the system or the apparatus read and execute the supplied program. Besides, the present disclosure can be realized also by a circuit (e.g., ASIC) of realizing one or more functions of the above embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-088702, filed May 9, 2019, which is hereby incorporated by reference herein in its entirety.

What is claimed is:

1. An information processing apparatus, connected to a printing apparatus, comprising:
a CPU;
a printer driver configured to cause the printing apparatus to perform a printing process; and
a print extension application configured to assist a function of the printer driver, wherein
the print extension application
provides a first print setting UI capable of setting first print setting for the printing apparatus, and a second print setting UI capable of setting second print setting for the printing apparatus, displaying for which a load on the CPU is smaller than that of the first print setting UI, and
performs determination as to whether to permit or inhibit display of the first print setting UI based on information regarding the CPU.

2. The information processing apparatus according to claim 1, wherein the print extension application inhibits the display of the first print setting UI in a case where the information regarding the CPU does not satisfy a predetermined condition.

3. The information processing apparatus according to claim 2, wherein the print extension application causes display of the second print setting UI in the case where the information regarding the CPU does not satisfy the predetermined condition.

4. The information processing apparatus according to claim 1, wherein
the first print setting ability is all of the print setting ability of the printing apparatus, and
the second print setting ability is a part of the print setting ability of the printing apparatus.

5. The information processing apparatus according to claim 1, wherein the information regarding the CPU represents a type of the CPU.

6. The information processing apparatus according to claim 1, wherein the information regarding the CPU represents a hardware characteristic of the CPU.

7. The information processing apparatus according to claim 1, wherein the print extension application further performs the determination as to whether to permit or inhibit the display of the first print setting UI based on information regarding the printer driver.

8. The information processing apparatus according to claim 1, wherein the print extension application provides a notifying way configured to notify, in case of inhibiting the display of the first print setting UI, a user that the display of the first print setting UI is inhibited.

9. The information processing apparatus according to claim 1, wherein the print extension application provides a selecting means to allow a user to select between the display of the first print setting UI and display of the second print setting UI.

10. The information processing apparatus according to claim 9, wherein, in case of inhibiting the display of the first print setting UI, the print extension application inhibits from providing the selecting means.

11. The information processing apparatus according to claim 1, wherein the print extension application is installed via a network.

12. The information processing apparatus according to claim 1, wherein the print extension application performs the determination based on the information regarding the CPU acquired when activated.

13. The information processing apparatus according to claim 12, wherein, when performing the determination, the print extension application stores a result of the determination.

14. The information processing apparatus according to claim 13, wherein, in a case where the result of the determination has been stored, the print extension application performs the determination based on the stored result of the determination.

15. A non-transitory computer readable memory including a print extension application, wherein the print extension application is configured to:
- acquire information regarding a processor of a computer to have the application installed;
- based on the acquired information, determine whether to instruct the processor to display, on a display of the computer, a first print setting UI that enables a user to set print options or a second print setting UI that enables a user to set print options, which is displayed with a less load than the first print setting UI.

16. A non-transitory computer readable memory according to claim 15, wherein the information is a type of the processor.

17. A non-transitory computer readable memory according to claim 15, wherein the processor is a CPU.

18. A non-transitory computer readable memory according to claim 15, wherein the first print setting UI is displayed when the processor is a first type of the processor, and the second print setting UI is displayed when the processor is a second type of the processor.

19. A computer having a print extension application installed, wherein the print extension application is configured to:
- acquire information regarding a processor of the computer;
- based on the acquired information, determine whether to instruct the processor to display, on a display of the computer, a first print setting UI that enable a user to set print options or a second print setting UI that enables a user to set print options, which is displayed with a less load than the first print setting UI.

20. A computer according to claim 19, wherein the information is a type of the processor.

21. A computer according to claim 19, wherein the processor is a CPU.

22. A computer according to claim 19, wherein the first print setting UI is displayed when the processor is a first type of the processor, and the second print setting UI is displayed when the processor is a second type of the processor.

* * * * *